(12) United States Patent
Daniels

(10) Patent No.: US 11,454,267 B2
(45) Date of Patent: Sep. 27, 2022

(54) LOCKING TELESCOPING ROD

(71) Applicant: Liberty Hardware Mfg. Corp., Winston-Salem, NC (US)

(72) Inventor: James Leroy Daniels, Stokesdale, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 17/071,709

(22) Filed: Oct. 15, 2020

(65) Prior Publication Data

US 2021/0025418 A1 Jan. 28, 2021

Related U.S. Application Data

(63) Continuation of application No. 15/815,025, filed on Nov. 16, 2017, now Pat. No. 10,844,890.

(51) Int. Cl.
*F16B 7/14* (2006.01)
*A47H 1/022* (2006.01)

(52) U.S. Cl.
CPC ............ *F16B 7/1445* (2013.01); *A47H 1/022* (2013.01)

(58) Field of Classification Search
CPC ......... A47H 1/022; E04H 12/182; F16B 7/14; F16B 7/1445; F16B 7/1463; Y10T 403/32467; Y10T 403/32483; Y10T 403/32491; Y10T 403/32501; Y10T 403/32527; Y10T 403/7091
USPC ......... 403/109.1, 109.3, 109.4, 109.5, 109.8, 403/379.6
See application file for complete search history.

(56) References Cited

U.S. PATENT DOCUMENTS

| | | |
|---|---|---|
| 2,508,039 A | 5/1950 | Herman |
| 2,542,967 A | 2/1951 | Waechter |
| 2,695,800 A | 11/1954 | Soucy |
| 2,947,556 A | 8/1960 | Wenger |
| 3,004,743 A | 10/1961 | Wenger |
| 3,098,669 A | 7/1963 | Philippe et al. |
| 4,134,703 A | 1/1979 | Hinners |
| 4,294,560 A | 10/1981 | Larkin |
| 4,659,126 A | 4/1987 | Breck et al. |
| 4,895,471 A | 1/1990 | Geltz et al. |
| 5,197,349 A | 3/1993 | Herman |

(Continued)

FOREIGN PATENT DOCUMENTS

| | | | |
|---|---|---|---|
| DE | 876164 C | * 5/1953 | ............ F16B 7/1445 |
| DE | 29620818 U1 | 1/1997 | |

(Continued)

*Primary Examiner* — Josh Skroupa
(74) *Attorney, Agent, or Firm* — Brooks Kushman P.C.

(57) ABSTRACT

A compression lock assembly for an adjustable length rod assembly with inner and outer tubes is provided. The compression lock assembly has an adapter adapted to be connected to rotate with the inner tube. An elastomeric ring with an inner opening and outer diameter is concentric and disposed coaxially with the adapter. A threaded fastener extends through the elastomeric ring and is fixed to the adapter. A lock nut is disposed about the threaded fastener and fixed to rotate with the elastomeric ring. The locking nut moves along the threaded fastener to compress the elastomeric ring and expand the outer diameter from a first diameter to a second diameter greater than the first diameter as the elastomeric ring is rotated relative to the adapter.

20 Claims, 2 Drawing Sheets

(56) References Cited

U.S. PATENT DOCUMENTS

| | | | |
|---|---|---|---|
| 5,803,643 A * | 9/1998 | Patelli | F16B 7/1463 403/109.1 |
| 5,826,847 A | 10/1998 | Warner et al. | |
| 8,215,501 B2 | 7/2012 | Trettin et al. | |
| 8,215,863 B2 | 7/2012 | Sohn | |
| 8,348,072 B2 | 1/2013 | Whitehall et al. | |
| 8,418,707 B2 | 4/2013 | Kim | |
| 8,479,932 B2 | 7/2013 | Carney | |
| 8,491,568 B2 | 7/2013 | Schertiger et al. | |
| 8,500,357 B2 | 8/2013 | Stahle | |
| 8,827,587 B2 | 9/2014 | Didehvar | |
| 8,851,305 B2 | 10/2014 | Didehvar | |
| 8,851,435 B1 * | 10/2014 | Bastien | A47H 1/022 248/251 |
| 8,960,456 B2 | 2/2015 | Didehvar | |
| 9,388,837 B1 | 7/2016 | Hanley | |
| 9,480,314 B2 | 11/2016 | Heim | |
| 10,024,347 B2 | 7/2018 | Bertrand et al. | |
| 10,047,787 B2 | 8/2018 | Cheng | |
| 2010/0310306 A1 | 12/2010 | Wright | |
| 2013/0032066 A1 | 2/2013 | Huskey | |
| 2013/0320666 A1 * | 12/2013 | Ko | F16B 7/1445 285/123.3 |
| 2016/0017906 A1 | 1/2016 | Bertrand et al. | |
| 2016/0177991 A1 | 6/2016 | Daniels et al. | |

FOREIGN PATENT DOCUMENTS

| | | | |
|---|---|---|---|
| DE | 10015506 C2 | 12/2002 | |
| EP | 1748196 A1 * | 1/2007 | F16B 7/1463 |
| EP | 2113674 A1 * | 11/2009 | F16B 7/1463 |

\* cited by examiner

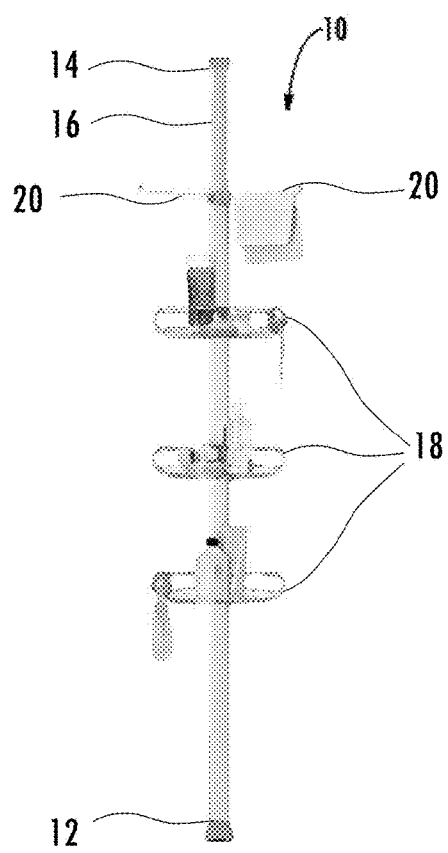
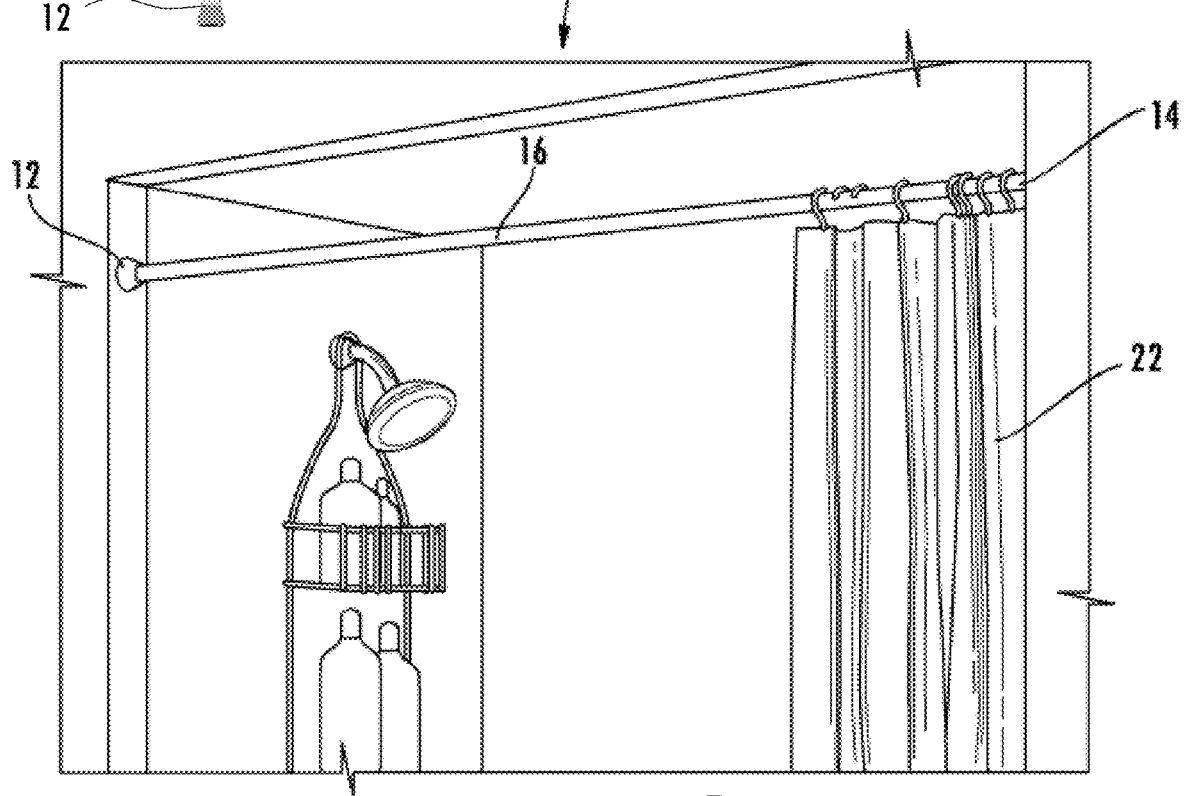
FIG. 1A
FIG. 1B

LOCKING TELESCOPING ROD

CROSS-REFERENCE TO RELATED APPLICATIONS

This application is a continuation of U.S. application Ser. No. 15/815,025 filed Nov. 16, 2017, now U.S. Pat. No. 10,844,890, issued on Nov. 24, 2020, the disclosure of which is hereby incorporated in its entirety by reference herein.

TECHNICAL FIELD

The present disclosure relates to a tubular rod having a selectively adjustable length for accommodating household articles.

BACKGROUND

Elongate mounting rods may be mounted or positioned in various locations as desired by a user. Such devices are suitable to accommodate various household articles. However, the corresponding environments that require mounting members can vary widely in both dimensions and orientation. A convenient way to adjust a length of a mounting member may ease the burden imposed upon a user when mounting in different environments. One example of an adjustable length mounting rod is disclosed in U.S. Patent Publication No. US 2016/0017906 assigned to Liberty Hardware Mfg. Ltd.

SUMMARY

According to at least one embodiment, an adjustable length rod assembly is provided. An inner tube defines a longitudinal axis. A lock mechanism is secured to an end of the inner tube. An elastomeric ring is disposed coaxially about the longitudinal axis. An outer tube is sized to receive the inner tube and the lock mechanism within an internal cavity. Wherein rotation of the outer tube relative to inner tube causes the lock mechanism to expand the elastomeric ring from a first diameter to a second diameter greater than the first diameter thereby providing an outward radial force against an internal surface of the outer tube to prevent translation of the inner tube relative to the outer tube.

In another embodiment, rotation of the outer tube relative to inner tube compresses a longitudinal length of the elastomeric ring and causes the elastomeric ring to expand from the first diameter to the second diameter when the inner and the outer tubes are rotated about the longitudinal axis.

In another embodiment, the longitudinal length is decreased by a compression dimension that is generally equal to a difference between the first and second diameters.

In another embodiment, the elastomeric ring has a plurality of radial ribs that protrude from a body of the elastomeric ring and extend longitudinally along the elastomeric ring.

In another embodiment, the plurality of ribs to contact the internal cavity of the outer tube when the elastomeric ring is at the first diameter, such that rotating the outer tube causes the elastomeric ring to rotate relative to the inner tube.

According to at least one other embodiment, a compression lock assembly for an adjustable length rod assembly with inner and outer tubes is provided. The compression lock assembly has an adapter adapted to be connected to rotate with the inner tube. An elastomeric ring with an inner opening and outer diameter is concentric and disposed coaxially with the adapter. A threaded fastener extends through the elastomeric ring and is fixed to the adapter. A lock nut is disposed about the threaded fastener and fixed to rotate with the elastomeric ring. The locking nut moves along the threaded fastener to compress the elastomeric ring and expand the outer diameter from a first diameter to a second diameter greater than the first diameter as the elastomeric ring is rotated relative to the adapter.

In another embodiment, the compression lock assembly has an adjustment post extending through the inner opening of the elastomeric ring with an outer surface shaped to mate with the inner opening so the adjustment post and elastomeric ring rotate together.

In another embodiment, the adjustment post has a cavity for receiving the lock nut. The cavity has an inner surface that mates with a peripheral surface of the lock nut so that the locking nut does not rotate relative to the adjustment post.

In another embodiment, the compression lock assembly has a spacer disposed between the adapter and the elastomeric ring, wherein the spacer rotates relative adapter.

In another embodiment, a distal end of the adjustment post engages the spacer so that the spacer rotates with the adjustment post and elastomeric ring.

In another embodiment, the elastomeric ring has a plurality of ribs protruding radially and extending longitudinally along the outer diameter.

In another embodiment, rotation of the elastomeric ring compresses a longitudinal length of the elastomeric ring, and wherein the longitudinal length is decreased by a compression dimension that is generally equal to a difference between the first and second diameters.

According to at least one other embodiment, an adjustable length rod assembly is provided having a first telescoping tube defining a longitudinal axis. A compression lock assembly is secured to an end of the first telescoping tube with an elastomeric ring disposed coaxially about the longitudinal axis. A second telescoping tube is sized to receive the first telescoping tube within an internal cavity and engage the elastomeric ring. Rotation of the second telescoping tube relative to first telescoping tube expands the elastomeric ring from an unlocked positioned having a first diameter to one of a plurality of locked positions having a second diameter greater than the first diameter. In each of the plurality of locked positions, the elastomeric ring provides an outward radial force against an internal surface of the second telescoping tube, thereby locking the second telescoping tube and preventing translation relative to the first telescoping tube.

In another embodiment, the elastomeric ring includes a plurality of radial ribs on an external surface to contact the second telescoping tube in the locked positions and in an unlocked position.

In another embodiment, in the unlocked position, only the radial ribs contact the internal cavity of the second telescoping tube and the main body does not contact the internal cavity of the second telescoping tube.

In another embodiment, in the unlocked position, frictional engagement of the radial ribs with the internal cavity causes the elastomeric ring to rotate relative to the first telescoping tube while an adapter of the compression lock assembly is fixed and does not rotate relative to the first telescoping tube.

In another embodiment, rotation of the second telescoping tube relative to first telescoping tube compresses a longitudinal length of the elastomeric ring and causes the elastomeric ring to expand from the first diameter to the second diameter when the first and the second telescoping tubes are rotated about the longitudinal axis.

In another embodiment, the compression lock assembly has a compression spring to provide a biasing force between the first and second telescoping tubes in a longitudinal direction.

BRIEF DESCRIPTION OF THE DRAWINGS

FIG. 1A is a perspective view of an adjustable length rod according to one embodiment of the present disclosure.

FIG. 1B is a perspective view of an adjustable length rod according to one other embodiment of the present disclosure.

DETAILED DESCRIPTION

Figure 2:
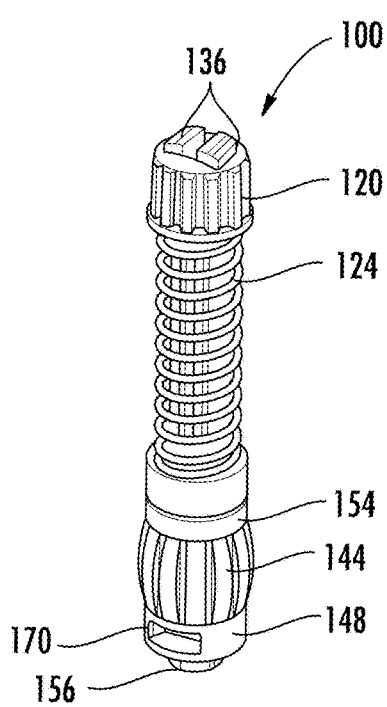
FIG. 2 is a perspective view a compression lock assembly according to one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Several household applications, such as kitchen and bathroom hardware, may benefit from the telescoping rod of the present disclosure. FIG. 1A illustrates an adjustable length rod assembly 10 that may provide vertical adjustment. For example, as shown in FIG. 1A, locking adjustable length rods may be suitable for applications requiring vertical floor to ceiling contact like in a shelving system. The adjustable length rod assembly 10 includes a first distal end 12 and a second distal end 14 with adjustable telescoping tubes 16 between the first and second distal ends 12, 14. In the shelving system example, the first and second distal ends 12, 14 interface with the floor and ceiling. For example, a shelving unit may include vertically adjustable telescoping tubes 16 affixed between upper and lower horizontal surfaces. The shelving unit may also include shelves 18 or bars 20 extending laterally from the telescoping tubes 16 at intermediate positions along the length.

In other hardware applications, a number of uses may require horizontal positioning of the adjustable length rod assembly 10. For example, FIG. 1B depicts an adjustable length rod assembly 10 that may be an adjustable length shower curtain rod, for example. In the shower curtain rod example, the first and second distal ends 12, 14 interface with opposing vertical walls of a shower opening. The adjustable telescoping tubes 16 allow the length of the rod 10 to be customized in length to conform to a range of shower opening dimensions. Once the adjustable length rod assembly 10 is adjusted to a particular shower opening size, a correspondingly sized shower curtain 22 may be hung from the adjustable length rod assembly 10. In additional embodiments, a window curtain rod may similarly be customized in length to fit a range of different window opening sizes. Aspects of the present disclosure provide a user-friendly, convenient adjustment to various telescoping tubes.

In yet another embodiment, the adjustable length rod 10 may be used with a pedestal toilet paper holder having an adjustable height. The toilet paper holder includes a base that is weighted and configured to rest on a horizontal surface such as a floor and an upper toilet paper dispenser. The toilet paper holder may include an adjustable length rod portion between the base and dispenser to adjust the height of the dispenser depending on the user placement.

FIG. 2 illustrates a perspective view a compression lock assembly 100 for use with an adjustable length rod assembly 110 in order to extend and retract over a range of lengths and lock the adjustable length rod assembly 110 at the length desired by a user.

Figure 3:
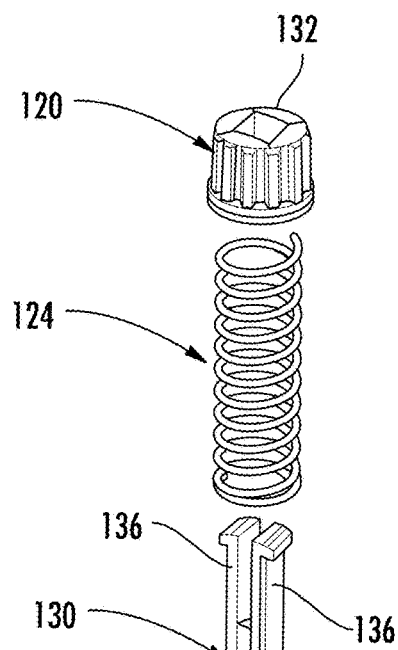
FIG. 3 a cut-away view of a portion of an adjustable length rod having the compression lock assembly of FIG. 2.
Figure 3:
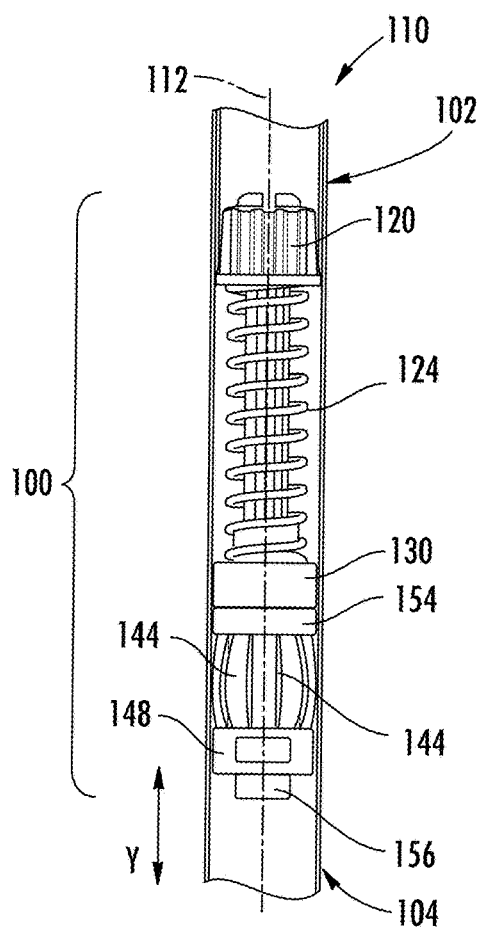

FIG. 3 illustrates a cut-away view of the adjustable length rod assembly 110 showing a side view of the compression lock mechanism 100. The adjustable length rod assembly 110 includes a first telescoping tube 102 and a second telescoping tube 104. Each of the first telescoping tube 102 and the second telescoping tube 104 are elongate and have a hollow inner cavity. In the telescoping arrangement, the first telescoping tube 102 is an inside tube, while the second telescoping tube is an outside tube. Therefore, the second telescoping tube 104 has an internal cavity with an internal diameter 106 that is greater than an outer diameter 108 of the first telescoping tube 102. The second telescoping tube 104 is large enough to slide over the first telescoping tube 102 to arrange the first and second telescoping tubes concentrically and coaxially about a common longitudinal central axis 112. When both telescoping tubes are combined, an overall length of the rod 10 may be extended or collapsed by longitudinally translating the second telescoping tube 104 relative to the first telescoping tube 102 along the central axis 112.

Figure 4:
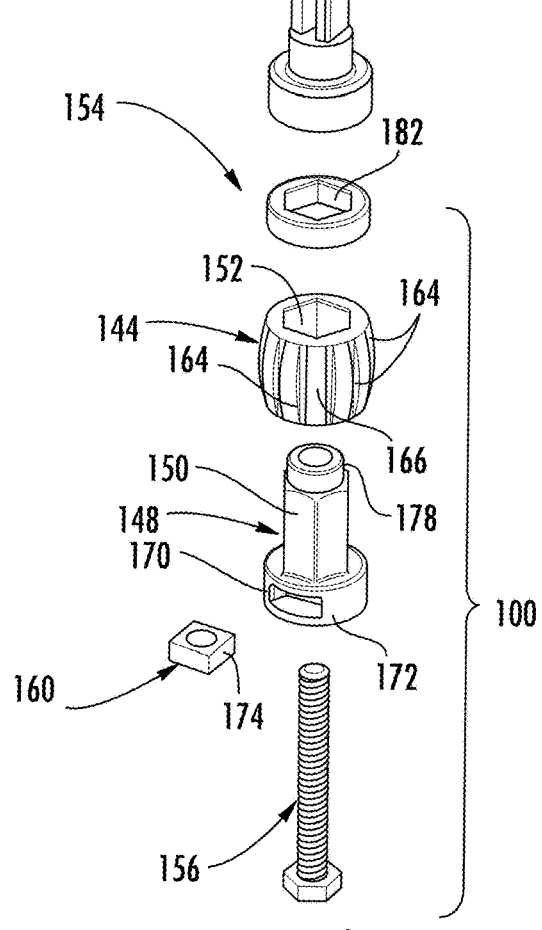
FIG. 4 is an exploded perspective view of the compression lock assembly of FIG. 2.

FIG. 4 illustrates an exploded view of the compression lock mechanism 100. The adjustable length rod assembly 110 is provided with the compression lock assembly 100 to lock the second telescoping tube 104 relative to the first telescoping tube 102 at various length positions. The compression lock assembly 100 includes an inside tube adaptor 120 that attaches to the smaller inner diameter of the first telescoping tube 102 of the adjustable length rod assembly 110. The inside tube adaptor 120 may be press fit, adhesively bonded, or staked with protrusions or formations of the inside tube 102.

The compression lock assembly 100 includes a compression spring 124 that provides tension to hold the rod assembly 110 in place. The compression spring 124 is placed around a post 130 that holds the compression spring 124 in place. The spring post 130 holds the compression spring 124 in place and slides within a post opening 132 that extends through the inside tube adaptor 120 as the spring 124 is compressed and expanded. The spring post 130 is connected to the inside tube adaptor 120 with an interference fit with the post opening 132 formed on the inside tube adaptor 120. For example, the spring post 130 may have deflectable tabs 136 that engage the post opening 132 with a snap fit.

The compression lock assembly 100 also includes a lock mechanism 140 that moves between an unlocked and locked position. The lock mechanism 140 includes an elastomeric ribbed ring 144 that expands to grip the inside of the outside tube 104 of the assembly in the locked position. The elastomeric ribbed ring 144 is formed from a flexible, closed section elastomeric material. In one embodiment, the elastomeric ring 144 may be rubber, PVC, polyurethane, polymer or other suitable soft elastomeric material.

The lock mechanism 140 includes an adjustment post 148 that compresses the elastomeric ribbed ring 144. The adjustment post 148 has an outer surface 150 that is keyed to mate with an inner opening 152 of the elastomeric ring 144. As shown in FIG. 4, the adjustment post 148 has a hexagonal shaped outer surface 150 that is keyed to mate with a hexagonal shaped inner opening 152 of the elastomeric ring 144. The inner opening 152 of the elastomeric ring 144 and the outer surface 150 mate so that the adjustment post 148 rotates with rotation of the elastomeric ring 144.

A spacer 154 is provided between the spring post 130 and the elastomeric ribbed ring 144. The spacer 154 allows the elastomeric ring 144 to turn easily relative to the spring post 130 without the soft elastomeric material binding on the spring post 130 that turns with the inside tube 102.

The lock mechanism 140 includes a fastener 156 and nut 160 to hold the adjustment post 148, elastomeric ribbed ring 144 and spacer 154 onto the compression lock assembly 100. The fastener 156 and nut 160 provide the adjustment that forces the elastomeric ribbed ring 144 to expand. In one embodiment, the fastener 156 may be a threaded hex bolt, however other suitable fasteners may be used.

The elastomeric ribbed ring 144 is sized to provide a slight friction fit to the inside of the outside tube. The elastomeric ribbed ring 144 has a plurality of ribs 164 that project radially from a main body 166 of the elastomeric ring 144. The ribs 164 extend in the longitudinal direction and are spaced apart along the cylindrical circumference of the elastomeric ring 144. In the unlocked position, only the ribs 164 contact the inner surface of the outside tube 104. However, in the unlocked position, the ribs 164 apply little outward or no pressure to the inner surface of the second telescoping tube 104 so the second telescoping tube 104 is able to translate longitudinally along the central axis 112.

The ribs 164 provide enough friction that when the inside tube 102 and outside tube 104 are twisted in opposite directions, the ribs 164 grip the outside tube 102 and cause the elastomeric ring 144 to concurrently turn and rotate with rotation of the outside tube 104. Because of the hex shape on the adjustment post 148 that mates with the hex shape on the inside of the ribbed ring 144, the adjustment post 148 also turns in the same direction as the outside tube 104.

The nut 160 is captured in a cavity 170 at a first end 172 of the adjustment post 148. The nut cavity 170 has an inner surface that corresponds to the outer peripheral surface 174 of the nut 160 to prevent the nut 160 from turning. As illustrated, the peripheral surface 174 forms a square shape and the cavity 170 also has a square shaped inner surface. A person having ordinary skill in the art would understand that other corresponding shapes of the cavity 170 and peripheral surface 174 of the nut 160 could be used prevent the nut 160 from turning relative to the adjustment post 148.

The adjustment post 148 engages the spacer 154 at a distal end 178 so that the spacer 154 rotates with the adjustment post 148 and elastomeric ring 144. As shown in FIG. 4, an inner opening 182 of the spacer 154 may also be shaped to mate with outer surface 150 of the adjusting post 148 to ensure the spacer 154 rotates with the elastomeric ring 144 and adjustment post 148. The distal end 178 of the adjustment post 148 may connect to the spring post 130, however the adjustment post 148 may rotate relative to the spring post 130.

In at least one embodiment, the spring post and compression spring may not be used. In the embodiment without the spring post and compression spring, the adjustment post 148 and the fastener 156 may be connected to the inside tube adapter 120.

The fastener 156 is threaded and through the nut 160 and the adjustment post 148. As the adjustment post 148 turns with the ribbed ring 144, the nut 160 is moved along the fastener 156 by threaded engagement and forces the adjustment post 148 to compress the elastomeric ribbed ring 144 against the spacer 154. As the elastomeric ribbed ring 144 is forced against the spacer 154, the elastomeric ring 144 compresses in the longitudinal direction Y and the diameter of the elastomeric ring 144 expands. As the diameter of the elastomeric ribbed ring 144 expands, the main body 166 of the elastomeric ring 144 is pressed tightly against the outside tube 104. The friction between the expanded elastomeric ring 144 prevents the elastomeric ring 144 from moving longitudinally and therefore prevents the inside tube 102 from moving relative to the outside tuber 104.

In one embodiment, when the inner and the outer telescoping tubes 102, 104 are rotated about the longitudinal axis 112, the lock mechanism 140 causes the elastomeric ring 144 to expand approximately three millimeters (mm) from the first diameter being approximately 24 mm to the second diameter being approximately 27 mm. When the inner and the outer telescoping tubes 102, 104 are rotated the lock mechanism 140 causes the elastomeric ring 144 to be compressed in the longitudinal direction, so the longitudinal length of the elastomeric ring 144 is decreased. In one embodiment, the longitudinal length of the elastomeric ring 144 is decreased by a compression dimension that is generally equal to a difference between the first and second diameters. For example, the longitudinal length of the elastomeric ring 144 is decreased by approximately 3 mm from 19 mm to 16 mm. A person having ordinary skill in the art would understand that the elastomeric ring 144 may have different dimensions and different expansion and compression numbers depending on numerous factors including the inner and outer diameters of the ring and the material for example.

Continuing to twist the inside tube 102 and outside tube 104 in opposite directions continues to compress the elastomeric ring 144 longitudinally and expand the diameter of the elastomeric ring 144, thereby increasing the frictional force. The increased frictional force better ensures the inside tube 102 and outside tube 104 stay locked and maintain the desired length between the first end 12 and second end 14 of the adjustable rod 10.

Counter-rotation from the locked position to the unlocked position reduces the outward forces to substantially zero allowing easy relative adjustment between the telescoping tubes. A user is thereby provided with a quick and ergonomically conducive way to engage and disengage the compression lock assembly 100.

The elastomeric ring 144 has a broad range between the minimum diameter and the maximum diameter of the elastomeric ring 144 which provides a larger range of the of engagement than the previous telescoping rod designs. This larger engagement range will allow the lock mechanism 140 provide sufficient locking force even with an outside tube 104 that has more variance in the inner cavity diameter. The larger engagement range also provides greater friction and more tightening that will prevent slipping of the outside tube 104 when installed than previous designs that only had one locked position. For example, in one embodiment, the lock mechanism 140 with the elastomeric ring 144 provides approximately twenty pounds or more of holding force. Whereas previous designs may have provided less than ten pounds of holding force.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable length rod assembly comprising:
   an inner tube defining a longitudinal axis;
   an outer tube sized to receive the inner tube,
   a lock mechanism having an elastomeric ring secured to an end of the inner tube; and
   wherein the rotation of the inner tube compresses a longitudinal length of the elastomeric ring and expands the elastomeric ring from a first diameter to a second diameter greater than the first diameter, and
   wherein rotation of the outer tube relative to inner tube compresses the longitudinal length of the elastomeric ring and causes the elastomeric ring to expand from the first diameter in an unlocked position to one of a plurality of locked positions having the second diameter greater than the first diameter thereby providing an outward radial force against an internal surface of the outer tube to prevent translation of the inner tube relative to the outer tube.

2. The adjustable length rod assembly of claim 1, wherein the lock mechanism comprises a threaded fastener extending through the elastomeric ring and configured to be fixed to rotate with the inner tube.

3. The adjustable length rod assembly of claim 2, wherein the elastomeric ring has an inner opening and outer diameter being concentric about the longitudinal axis.

4. The adjustable length rod assembly of claim 3, wherein the locking mechanism further comprises:
   a lock nut disposed about the threaded fastener and fixed to rotate with the elastomeric ring,
   wherein the lock nut and the threaded fastener move relative to each other to compress the elastomeric ring and expand the outer diameter from the first diameter to the second diameter,
   wherein the threaded fastener is fixed to rotate with the inner rod,
   an adjustment post extending through the elastomeric ring with an outer surface shaped to mate with elastomeric ring so the adjustment post and elastomeric ring rotate together,
   wherein the adjustment post has a cavity that cooperates with the locking nut so that the locking nut does not rotate relative to the adjustment post.

5. The adjustable length rod assembly of claim 4, wherein the adjustment post has an outer surface shaped to mate with an inner opening of the elastomeric ring so the adjustment post and elastomeric ring rotate together,
   wherein the cavity has an inner surface shaped to mate with a peripheral surface of the lock nut so that the locking nut does not rotate relative to the adjustment post.

6. The adjustable length rod assembly of claim 5, wherein the lock mechanism further comprises a compression spring to provide a biasing force between the inner and outer tubes in a longitudinal direction.

7. The adjustable length rod assembly of claim 1, wherein the longitudinal length is decreased by a compression dimension that is generally equal to a difference between the first and second diameters.

8. The adjustable length rod assembly of claim 1, wherein the elastomeric ring has a plurality of radial ribs extending radially from a main body to contact the outer tube in the locked positions and in the unlocked position.

9. The adjustable length rod assembly of claim 4, wherein in the unlocked position, only the radial ribs contact an internal cavity of the outer tube and the main body does not contact the internal cavity of the outer tube.

10. The adjustable length rod assembly of claim 4, wherein in the unlocked position, frictional engagement of the radial ribs with the outer tube causes the elastomeric ring to rotate relative to the inner tube while an adapter locking mechanism is fixed and does not rotate relative to the inner tube.

11. A compression lock assembly for an adjustable length rod assembly with inner and outer tubes, the compression lock assembly comprising:
    an elastomeric ring configured to be connected to a first end of the inner tube;
    a threaded fastener extending through the elastomeric ring and configured to be fixed to rotate with the inner tube;
    wherein the rotation of the inner tube and threaded fastener compresses a longitudinal length of the elastomeric ring and expands the elastomeric ring from a first diameter to a second diameter greater than the first diameter.

12. The compression lock assembly of claim 11, further comprising:
    an adapter adapted to be connected to rotate with the inner tube;
    a lock nut disposed about the threaded fastener and fixed to rotate with the elastomeric ring,
    a spacer disposed between the adapter and the elastomeric ring, wherein the spacer rotates relative to the adapter.

13. The compression lock assembly of claim 11, wherein the elastomeric ring has an inner opening and outer diameter being concentric about the longitudinal axis, and
    further comprising an adjustment post extending through the inner opening of the elastomeric ring with an outer surface shaped to mate with the inner opening so the adjustment post and the elastomeric ring rotate together.

14. The compression lock assembly of claim 13, wherein a distal end of the adjustment post engages a spacer so that the spacer rotates with the adjustment post and elastomeric ring.

15. The compression lock assembly of claim 11, wherein the elastomeric ring comprises a plurality of ribs protruding radially and extending longitudinally along the outer diameter.

16. The compression lock assembly of claim 11, wherein rotation of the elastomeric ring compresses a longitudinal length of the elastomeric ring, and wherein the longitudinal length is decreased by a compression dimension that is generally equal to a difference between the first and second diameters.

17. An adjustable length rod assembly comprising:
    an inner tube defining a longitudinal axis;
    a compression lock assembly of claim 11 secured to an end of the inner tube; and
    an outer telescoping tube sized to receive the inner tube and the compression lock assembly within an internal cavity, wherein rotation of the outer tube relative to inner tube rotates the elastomeric ring and expands the elastomeric ring from the first diameter to the second diameter thereby preventing translation of the outer tube relative to the inner tube.

18. The compression lock assembly of claim 11, further comprising a threaded fastener extending through the elastomeric ring; and
- a lock nut disposed about the threaded fastener and fixed to rotate with the elastomeric ring,
- wherein the locking nut and the threaded fastener move relative to each other to compress the elastomeric ring and expand the outer diameter from the first diameter to the second diameter,
- wherein the threaded fastener is fixed to rotate with the inner rod,
- an adjustment post extending through the elastomeric ring with an outer surface shaped to mate with elastomeric ring so the adjustment post and elastomeric ring rotate together,
- wherein the adjustment post has a cavity that cooperates with the locking nut so that the locking nut does not rotate relative to the adjustment post.

19. The compression lock assembly of claim 18, wherein the adjustment post has an outer surface shaped to mate with an inner opening of the elastomeric ring so the adjustment post and elastomeric ring rotate together,
- wherein the cavity has an inner surface shaped to mate with a peripheral surface of the lock nut so that the lock nut does not rotate relative to the adjustment post.

20. The compression lock assembly of claim 19, further comprising a compression spring to provide a biasing force between the inner and outer tubes in a longitudinal direction.

\* \* \* \* \*

UNITED STATES PATENT AND TRADEMARK OFFICE
CERTIFICATE OF CORRECTION

| | | |
|---|---|---|
| PATENT NO. | : 11,454,267 B2 | Page 1 of 1 |
| APPLICATION NO. | : 17/071709 | |
| DATED | : September 27, 2022 | |
| INVENTOR(S) | : James Leroy Daniels et al. | |

It is certified that error appears in the above-identified patent and that said Letters Patent is hereby corrected as shown below:

In the Claims

Column 8, Line 5, Claim 9:
After "The adjustable length rod assembly of claim"
Delete "4" and
Insert -- 8 --.

Column 8, Line 9, Claim 10:
After "The adjustable length rod assembly of claim"
Delete "4" and
Insert -- 8 --.

Signed and Sealed this
Thirtieth Day of April, 2024

*Katherine Kelly Vidal*

Katherine Kelly Vidal
*Director of the United States Patent and Trademark Office*